United States Patent Office 2,985,651
Patented May 23, 1961

---

2,985,651

PREPARATION OF STEROID COMPOUNDS

Vladimir Petrow, George Cooley, and Bernard Ellis, London, England, assignors to The British Drug Houses Limited, London, England, a British company No Drawing. Filed July 7, 1958, Ser. No. 746,590

Claims priority, application Great Britain July 18, 1957

9 Claims. (Cl. 260—239.55)

This invention is for improvements in or relating to organic compounds, and has particular reference to an improved method for the preparation of 6β:21-dimethyl-17α-pregn-20-yne-3β:5α:17β-triol having the Formula I below. The latter compound is a valuable intermediate in the synthesis of the orally-active progestagen 6α:21-dimethyl-17β-hydroxy-17α-pregn-4-en-20-yn-3-one by oxidation with chromium trioxide in pyridine and reacting the resulting 3-oxo-derivative with a source of hydrogen ions in ethanol. See Example 9 of copending application Ser. No. 710,200, filed January 21, 1958, and having a priority date of January 25, 1957, based on British application No. 2,820/57.

It is an object of the present invention to provide a process for the preparation of 6β:21-dimethyl-17α-pregn-2-yne-3β:5α:17β-triol having the Formula I below which process utilises as starting material the compound 3β:17β-dihydroxy-21-methyl-17α-pregn-20-yn-5-ene (17α-(prop-1-ynyl)-androst-5-ene-3β:17β-diol) having the Formula II (R=H) below.

According to the present invention there is provided a method for the preparation of 6β:21-dimethyl-17α-pregn-20-yne-3β:5α:17β-triol having the formula

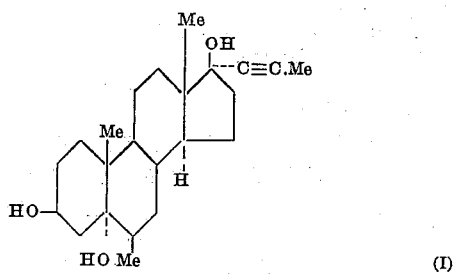

(I), which method comprises oxidising 3β:17β-dihydroxy-21-methyl-17α-pregn-20-yn-5-one having the formula

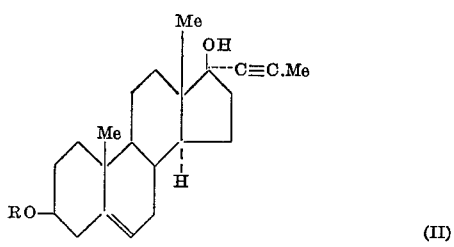

(where R=H) or its 3β-acyloxy derivatives (R=acyl) to the corresponding 5α:6α-epoxide having the formula

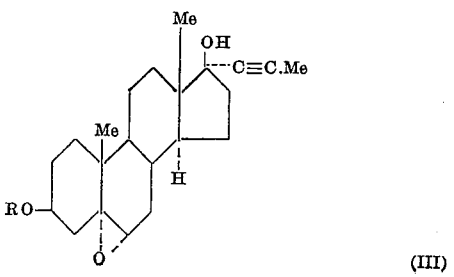

(where R=H or acyl), and reacting the 5α:6α-epoxide with a methylmagnesium halide.

Conversion of compound II (R=H) or acyl) into the corresponding 5α:6α-epoxide (III; R=H or acyl) may be effected by treating compound II (R=H or acyl) in a suitable solvent, such as, for example, tetrahydrofuran, ether or chloroform, with a per-acid such as perbenzoic acid or monoperphthalic acid. The 5α:6α-epoxide so formed may be admixed with varying proportions of the isomeric 5β:6β-epoxide which may be removed by conventional methods such as fractional crystallisation. If the starting material (II) is the 3β-hydroxy compound, it may be advantageous to convert the 3β-hydroxy-5α:6α-epoxide to a 3β-acyloxy derivative before reaction with the methylmagnesium halide.

Conversion of the 3β-hydroxy or 3β-acyloxy-5α:6α-epoxide (III; R=H or acyl) into the required 6β:21-dimethyl-17α-pregn-20-yne-3β:5α:17β-triol (I) may be readily effected by treating compound III (R=H or acyl) in a solvent, such for example as benzene or butyl ether with excess methylmagnesium iodide (or chloride or bromide) in a solvent, for example, ether or butyl ether, after which the mixture may be heated and thereafter maintained at an elevated temperature until reaction is complete. This generally requires from 3 to 5 hours at a temperature in the region of 78° C. Alternatively the mixture can be allowed to stand at room temperature for two to four days. The Grignard mixture is then decomposed, for example with aqueous ammonium chloride, and the product (I) isolated and purified.

Following is a description by way of example of a method of preparing the starting material 3β:17β-dihydroxy-21-methyl-17α-pregn-20-yn-5-ene (17α-(prop-1-ynyl)-androst-5-en-3β:17β-diol). A solution of ethyl magnesium bromide was prepared under nitrogen in a 3-necked flask fitted with a dropping funnel, stirrer and reflux condenser from magnesium (3.65 g.), ethyl bromide (16.3 g.) and anhydrous tetrahydrofuran (150 ml.). The solution was heated under reflux for 30 minutes, and then allowed to cool to room temperature. The reflux condenser was then replaced by a condenser cooled by acetone/solid $CO_2$, and the dropping funnel cooled by the addition of tetrahydrofuran (20 ml.) at −60° C. 1-propyne (8 g.) was weighed out in a flask cooled to −60° C., dissolved in tetrahydrofuran (60 ml.) at −60° C., transferred to the dropping funnel and quickly added to the Grignard solution with stirring. Evolution of ethane occurred, and stirring was continued for 30 minutes, by which time evolution of ethane had ceased. The reflux condenser was then returned to the flask and a solution of dehydroisoandrosterone (4.3 g.) in tetrahydrofuran (100 ml.) added dropwise with stirring. A gelatinous precipitate was formed, and the mixture was stirred under reflux for 2 hours. The complex was decomposed with ammonium chloride (50 g.) in water (200 ml.) and the product isolated with ether. Removal of the solvent under reduced pressure gave a solid residue which crystallised from acetone/hexane as colourless plates, M.P. 176 to 180° C. Recrystallisation from aqueous methanol gave the monohydrate of 17α-(prop-1-ynyl)androst-5-en-3β:17β-diol as plates, M.P. 179 to 181° C., $[α]_D^{21}$ −121° (c., 0.98 in chloroform).

Following is a description by way of example of methods of carrying the invention into effect.

*Example I*

3β:17β-dihydroxy-21-methyl-17α-pregn-20-yn-5-ene (20 g.) in tetrahydrofuran (250 ml.) was treated for 24 hours at room temperature with a solution of monoperphthalic acid (20 g.) in ether (400 ml.). The mixture was washed with aqueous potassium carbonate until the washings were alkaline, and then with water until the washings were neutral. The organic layer was concentrated somewhat under reduced pressure, poured into a relatively large volume of water, and most of the residual solvents removed in a current of air. The solid product was collected and crystallised from aqueous ethanol to give 3β:17β-dihydroxy-5α:6α-epoxy-21-methyl-17α-pregn-20-yne, needles, M.P. 200 to 201° C., $[\alpha]_D^{24}$ —121° (c., 0.98 in chloroform), after drying for five hours at 100° C. 5 g. of the solid product in 20 ml. of dry pyridine were treated with 5 ml. of propionic anhydride for 24 hours at room temperature. Water was added to precipitate the 3-monopropionate which crystallised from aqueous methanol in needles, M.P. 206 to 207° C., $[\alpha]_D^{21}$ —104° (c., 0.9 in chloroform).

The foregoing 5α:6α-epoxy-3-monopropionate (18.5 g.) in benzene (600 ml.) was added to a Grignard reagent prepared from magnesium (12.6 g.), methyl iodide (34 ml.) and ether (185 ml.). The mixture was distilled until a vapour-temperature of 78° C., was reached, whereafter the residual mixture was heated under reflux for 5 hours. The mixture was then cooled in an ice-bath, and the Grignard complex decomposed by the slow addition, with stirring, of ammonium chloride (80 g.) in water (250 ml.). The organic layer was washed with water, the solvent removed under reduced pressure, and the residue purified from aqueous ethanol. There was obtained 6β:21-dimethyl-17α-pregn-20-yne-3β:5α:17β-triol, needles, M.P. 217 to 220° C.

*Example II*

3β-acetoxy-17β-hydroxy - 21 - methyl-17α-pregn-20-yn-5-ene (M.P. 201 to 201° C., $[\alpha]_D^{20}$ —118° C.) (20 g.) in chloroform (75 ml.) was treated for 24 hours at room temperature with a solution of perbenzoic acid (18 g.) in chloroform (450 ml.). The mixture was washed with aqueous sodium hydroxide, water, and then dried. Removal of the solvent gave a residue which was crystallised from methanol. 3β-acetoxy-5α:6α-epoxy-17β-hydroxy-21-methyl-17α-pregn-20-yne separated in prisms, M.P. 245 to 247° C., $[\alpha]_D^{23}$ —11° (c., 1.0 in chloroform).

The foregoing epoxide (10 g.) in butyl ether (1 l.) was added to a Grignard reagent prepared from magnesium (6 g.) and methyl bromide (25 g.). The mixture was stirred, and heated at 80° C. for 4 hours. The mixture was then cooled, and the complex decomposed by the slow addition of aqueous ammonium chloride. The organic solvent was removed by steam-distillation, and the product isolated by extraction with ether. Crystallisation from aqueous ethanol gave 6β:21-dimethyl-17α-pregn-20-yne-3β:5α:17β-triol, in needles, M.P. 217 to 219° C.

We claim:
1. A method for the preparation of 6β:21-dimethyl-17α-pregn-20-yne-3β:5α:17β-triol which comprises reacting a compound selected from the class consisting of 3β-hydroxy- and 3β-lower acyloxy-17β-hydroxy-21-methyl-17α-pregn-20-yn-5-enes in an inert organic solvent with an organic peracid to provide the corresponding 5α:6α-epoxide of said compound, and reacting said 5α:6α-epoxide in an inert organic solvent with a methylmagnesium halide to give the corresponding 6β-methyl-5α-hydroxy product.

2. A method as claimed in claim 1 wherein said method is effected by reacting 3β:17β-dihydroxy-21-methyl-17α-pregn-20-yn-5-ene in an inert organic solvent with monoperphthalic acid.

3. A method as claimed in claim 1 wherein said 5α:6α-epoxide in an inert organic solvent is reacted with excess methylmagnesium iodide in an inert organic solvent.

4. A method as claimed in claim 1 wherein said method is effected by reacting 3β-acyloxy-17β-hydroxy-21-methyl-17α-pregn-20-yn-5-ene in an inert organic solvent with perbenzoic acid.

5. A method for the preparation of 6β:21-dimethyl-17α-pregn-20-yne-3β:5α:17β-triol which comprises reacting 3β:17β-dihydroxy - 21 - methyl-17α-pregn-20-yn-5-ene with an organic per-acid selected from the group consisting of perphthalic acid and perbenzoic acid to provide the corresponding 3β-hydroxy-5α:6α-epoxide, reacting said 3β-hydroxy-5α:6α-epoxide with an acylating agent providing a lower acyl group to give the corresponding 3β-lower acyloxy-5α:6α-epoxide, and reacting said 3β-lower acyloxy-5α:6α-epoxide with a methylmagnesium halide to give the corresponding 6β-methyl-5α-hydroxy product.

6. A compound selected from the group consisting of 3β-hydroxy and 3β-lower acyloxy-17β-hydroxy-5α:6α-epoxide-21-methyl-17α-pregn-20-ynes.

7. 3β:17β - dihydroxy - 5α:6α - epoxy-21-methyl-17α-pregn-20-yne.

8. 5α:6α-epoxy - 17β - hydroxy-21-methyl-3β-propionoxy-17α-pregn-20-yne.

9. 3β-acetoxy-5α:6α-epoxy - 17β - hydroxy-21-methyl-17α-pregn-20-yne.

References Cited in the file of this patent

UNITED STATES PATENTS

| | | |
|---|---|---|
| 2,838,500 | Campbell et al. | June 10, 1958 |
| 2,878,246 | Miramontes et al. | Mar. 17, 1959 |

OTHER REFERENCES

"Thurnal Obshchei Khimu," vol. 9 (1939), pp. 436–441.